United States Patent
Staudacher et al.

(10) Patent No.: US 8,089,516 B2
(45) Date of Patent: Jan. 3, 2012

(54) EVENT MANAGEMENT FOR CAMERA SYSTEMS

(75) Inventors: David Staudacher, Ft Collins, CO (US); Daniel G. Franke, Ft Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1521 days.

(21) Appl. No.: 11/471,229

(22) Filed: Jun. 20, 2006

(65) Prior Publication Data
US 2007/0291124 A1    Dec. 20, 2007

(51) Int. Cl.
*H04N 5/225* (2006.01)
*H04N 9/04* (2006.01)
*H04N 5/235* (2006.01)
*H04N 9/73* (2006.01)
*H04N 5/232* (2006.01)
*G03B 13/00* (2006.01)

(52) U.S. Cl. ............. 348/207.99; 348/221.1; 348/223.1; 348/345

(58) Field of Classification Search ............. 348/207.99, 348/362, 221.1–225.1, 345–347; 710/260–269; 712/244
See application file for complete search history.

(56) References Cited

U.S. PATENT DOCUMENTS

| | | | | |
|---|---|---|---|---|
| 4,974,078 A | | 11/1990 | Tsai | |
| 5,454,095 A | * | 9/1995 | Kraemer et al. | 701/104 |
| 5,481,706 A | * | 1/1996 | Peek | 710/200 |
| 5,481,747 A | * | 1/1996 | Kametani | 718/102 |
| 5,502,840 A | * | 3/1996 | Barton | 710/200 |
| 5,801,773 A | * | 9/1998 | Ikeda | 348/229.1 |
| 6,115,799 A | | 9/2000 | Ogawa | |
| 6,269,390 B1 | * | 7/2001 | Boland | 718/100 |
| 6,289,369 B1 | * | 9/2001 | Sundaresan | 718/103 |
| 6,426,771 B1 | * | 7/2002 | Kosugi | 348/222.1 |
| 6,470,413 B1 | | 10/2002 | Ogawa | |
| 6,900,835 B2 | | 5/2005 | Cazier et al. | |
| 7,019,778 B1 | | 3/2006 | Prahu et al. | |
| 7,382,978 B2 | * | 6/2008 | Kaku | 396/321 |
| 7,532,234 B2 | * | 5/2009 | Sadovsky et al. | 348/207.1 |
| 7,548,258 B2 | * | 6/2009 | Kaplinsky | 348/211.99 |
| 7,694,302 B1 | * | 4/2010 | Rajan et al. | 718/104 |
| 2001/0030694 A1 | * | 10/2001 | Abe | 348/223 |
| 2003/0117507 A1 | * | 6/2003 | Kehtarnavaz et al. | 348/242 |
| 2003/0154332 A1 | * | 8/2003 | Tserng | 710/52 |
| 2006/0007327 A1 | * | 1/2006 | Nakamura et al. | 348/239 |
| 2006/0023070 A1 | * | 2/2006 | Nakamura et al. | 348/207.99 |
| 2006/0164514 A1 | * | 7/2006 | Muramatsu et al. | 348/207.99 |

\* cited by examiner

*Primary Examiner* — Nhan T Tran
*Assistant Examiner* — Tuan Le

(57) ABSTRACT

Systems and methods of event management for camera systems are disclosed. In an exemplary implementation, a method may comprise publishing a plurality of event notifications identifying available frame data. The method may also comprise subscribing a program code module to at least one of the event notifications. The method may also comprise executing a process at the program code module corresponding to the subscribed event notification after the subscribed event notification is published.

18 Claims, 4 Drawing Sheets

EVENT MANAGEMENT FOR CAMERA SYSTEMS

BACKGROUND

Conventional film and more recently, digital cameras, are widely commercially available, ranging both in price and in operation from sophisticated single lens reflex (SLR) cameras used by professional photographers to inexpensive "point-and-shoot" cameras that nearly anyone can use with relative ease. Unlike conventional film cameras, however, digital cameras typically collect frame data for displaying a "live view" for the user and/or for use in various processes embodied in firmware for the digital camera.

For purposes of illustration, frame data may be used by the firmware for auto-exposure calculations. The output may be used by another process to adjust exposure settings. More frame data may then be gathered using the new exposure settings to display a revised "live view" for the user and/or continued auto-exposure calculations. Of course gathering frame data and displaying the "live view" for the user typically occurs very fast, e.g., generating "live view" images on the order of 24 to 30 times per second.

In any event, the frame data may be needed by more than one process at a time and/or the results of various processes may be needed for another process. For example, frame data may be needed by both auto-exposure calculations and auto-focus calculations in addition, output from the auto-exposure calculations may also be needed for display calculations. Accordingly, firmware for the camera is written such that the frame data and results cascade from one process to the next.

Such firmware designs may result in slower operations (e.g., all processes may stall while waiting for one of the processes to complete) in addition, if a process is changed or a new process is added, the firmware may need to be rewritten to accommodate the change and/or new process.

DETAILED DESCRIPTION

Systems and methods described herein disclose event management for camera systems. Exemplary systems and methods arrange processes as individual program code modules which may be executed concurrently and independently of one another. An event manager coordinates the individual program code modules by notifying the program code modules when an event occurs (e.g., frame data is available from the sensor device and/or results of a calculation are available). The program code modules execute if the event occurs.

Individual modules may then publish results of the process to the event manager, which in turn publishes an event notifying other modules that the results are available. Accordingly, the program code modules may be provided independent of one another and may be added/changed without having to rewrite the firmware.

In exemplary embodiments, a closed-loop data path is provided between the event manager, the program code modules, and the sensor device. The closed-loop data path receives output from the executing program code modules and feeds back the output to the sensor device for changing the frame data for the event manager. For example, output from the executing program code modules may indicate the frame data needs to be brighter or darker for the other processes. Accordingly, the aperture settings on the camera system may be changed to generate brighter or darker frame data.

In other exemplary embodiments, the program code modules may verify that the frame data has not changed during execution (e.g., by execution of another program code module). If the frame data changed during execution, the program code module may be re-executed so that the output is based on the most recently available frame data.

Figure 1:
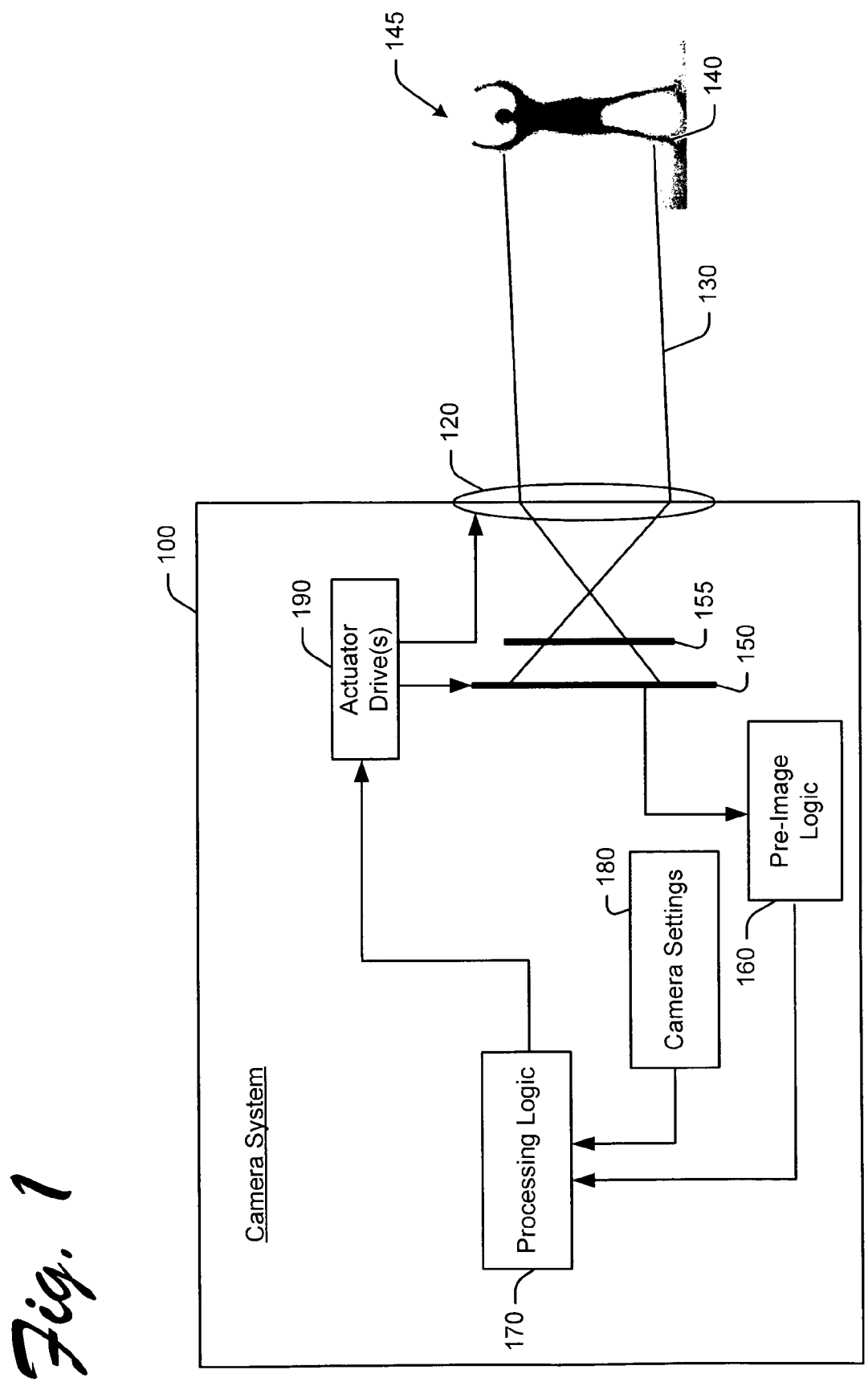
FIG. 1 is a block diagram of an exemplary camera system which may implement event management.

FIG. 1 is a block diagram of an exemplary camera system 100 which may implement event management. The exemplary camera system 100 may be implemented as digital still-photo and/or video cameras, now known or that may be later developed.

Exemplary camera system 100 may include a lens 120 positioned in the camera system 100 to focus light 130 reflected from one or more objects 140 in a scene 145 onto an image sensor 150 when a shutter 155 is open (e.g., for image exposure). Exemplary lens 150 may be any suitable lens which focuses light 130 reflected from the scene 145 onto image sensor 150.

Exemplary image sensor 150 may be implemented as a plurality of photosensitive cells, each of which builds-up or accumulates an electrical charge in response to exposure to light. The accumulated electrical charge for any given pixel is proportional to the intensity and duration of the light exposure. Exemplary image sensor 150 may include, but is not limited to, a charge-coupled device (CCD), or a complementary metal oxide semiconductor (CMOS) sensor.

Camera system 100 may also include pre-image logic 160. In digital cameras, the pre-image logic 160 receives electrical signals from the image sensor 150 representative of the light 130 captured by the image sensor 150 during exposure to generate a digital pre-image of the scene 145.

Using a pre-image enables the camera system to perform various processes (e.g., anti-aliasing, auto-focus, image stabilizing, detecting white balance, etc.) independent of any knowledge about the lens quality, zoom, and/or aperture settings. The pre-image(s) may be one or more of the pre-images already being implemented by the camera for focusing, auto-exposure, pre-flash calculations, and/or the pre-image(s) may be obtained specifically for displaying to the user.

Camera system 100 may also include processing logic 170. Processing logic 170 may receive the pre-image data from pre-image logic 160 and perform various calculations or processes on the pre-image (or "frame data"). Exemplary processing logic 170 may include processes for, e.g., anti-aliasing, auto-focus, image characterizing, generating a visual image for the user, etc.

Processing logic 170 may receive input from other sources in addition to the pre-image logic 160. For example, camera settings data 180 may also be provided as input to the processing logic 170. Output from the processing logic 170 may be used by one or more other program code modules in the processing logic 170 and/or by system devices (e.g., actuator drives 190 for image stabilizing, auto-focus, and/or auto-exposure). In an exemplary embodiment, the processing logic 170 may include a plurality of processes implemented as individual program code modules to handle process flow in the camera system 100, as described in more detail below.

Before continuing, it is noted that shutters, image sensors, and other devices and logic, such as those illustrated in FIG. 1 and others not shown, are well-understood in the camera and photography arts. These components may be readily provided for camera system 100 by those having ordinary skill in the art after becoming familiar with the teachings herein, and therefore further description is not necessary.

It is also noted that the camera system 100 shown and described above with reference to FIG. 1 is merely exemplary of a camera system which may implement event management. The systems and methods described herein are not intended to be limited only to use with the camera system 100. Other embodiments of camera systems which may implement event management are also contemplated.

Figure 2:
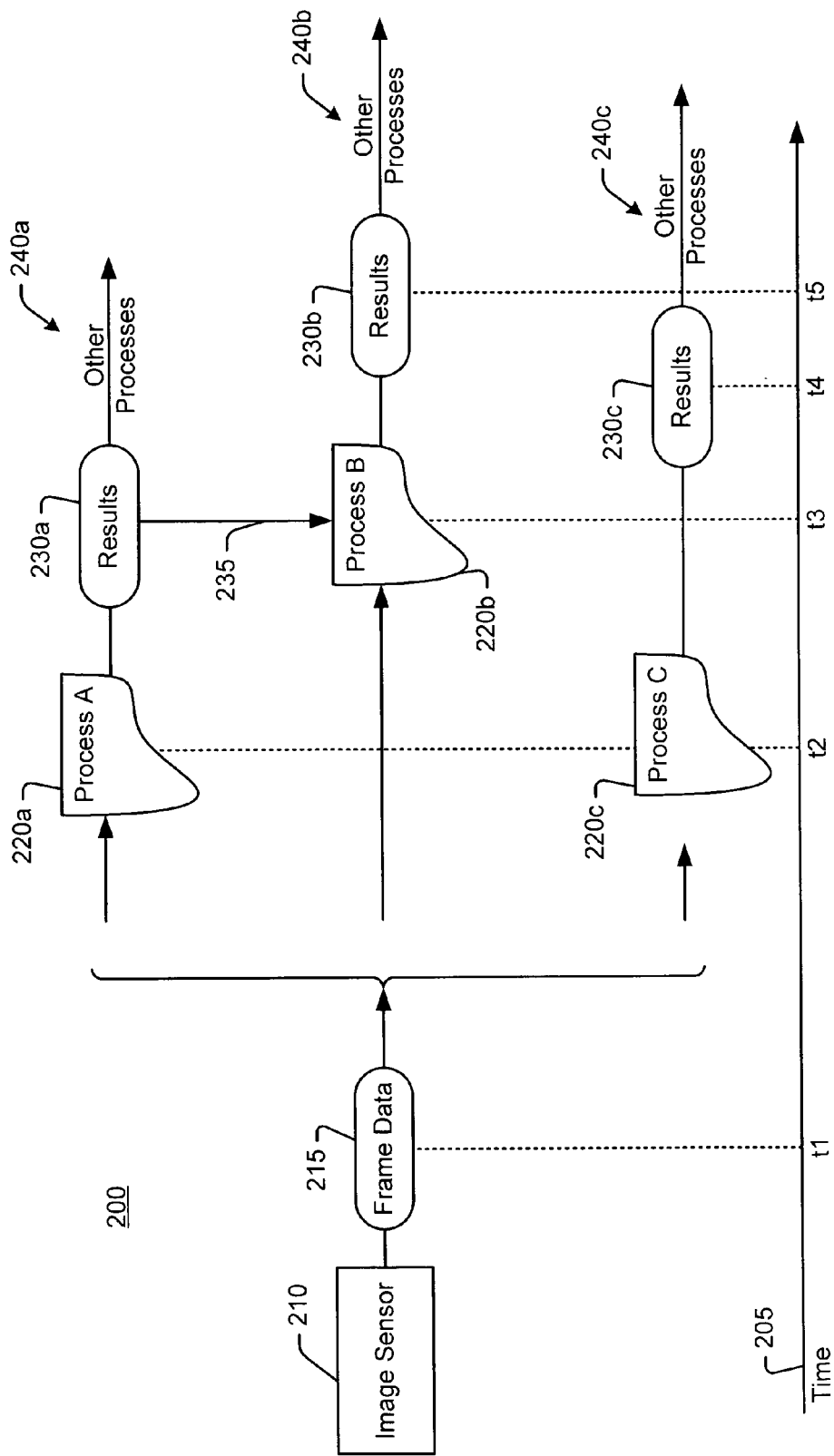
FIG. 2 is a timing diagram illustrating an exemplary process flow for various processes executing on a camera system.

FIG. 2 is a timing diagram 200 illustrating an exemplary process flow for various processes executing on a camera system (e.g., the camera system 100 shown in FIG. 1). A timeline 205 is illustrated along the bottom portion of the drawing indicating various times t1-t5 during the process flow.

At time t1, the image sensor 210 may generate frame data 215 (e.g., a pre-image). The frame data 215 is available to one or more of the processes. Process A and Process C (processes 220a and 220c) may utilize the frame data at time t2, e.g., immediately when the frame data is available. Process B (process 220b), however, needs both the frame data 215 and the results 230a from Process A to execute. At time t3, the results 230a from executing Process A are available and may be delivered to Process B (as illustrated by arrow 235) so that Process B may be executed. At time t4, the results 230c from executing Process C are available, and at time t5 the results 230b from executing Process B are available.

It is noted that because the processes 220a-c are implemented as individual program code modules, Process A and Process C may be begin simultaneously (e.g., at time t2). Frame data 215 may be provided to both Process A and Process C without having to wait for one of the other processes 240a-c to complete. Likewise, when the results 230a from executing Process A are available, Process B can start without having to wait for Process C to complete. In addition, the results 230a-c may be made available to other processes 240a-c on completion of the respective processes 220a-c without having to wait for other process to complete.

It is noted that the process flow discussed above with reference to FIG. 2 is provided only for purposes of illustration and not intended to be limiting. Other processes may be executing simultaneously and/or at other times. In addition, the process flow may be much more complicated than what is illustrated in FIG. 2, e.g., with results, frame data, and revised or updated frame data from multiple processes being made available at different stages during the execution of one or more processes. Exemplary functional components for managing process flow as illustrated in FIG. 2 are discussed in more detail below with reference to FIG. 3.

Figure 3:
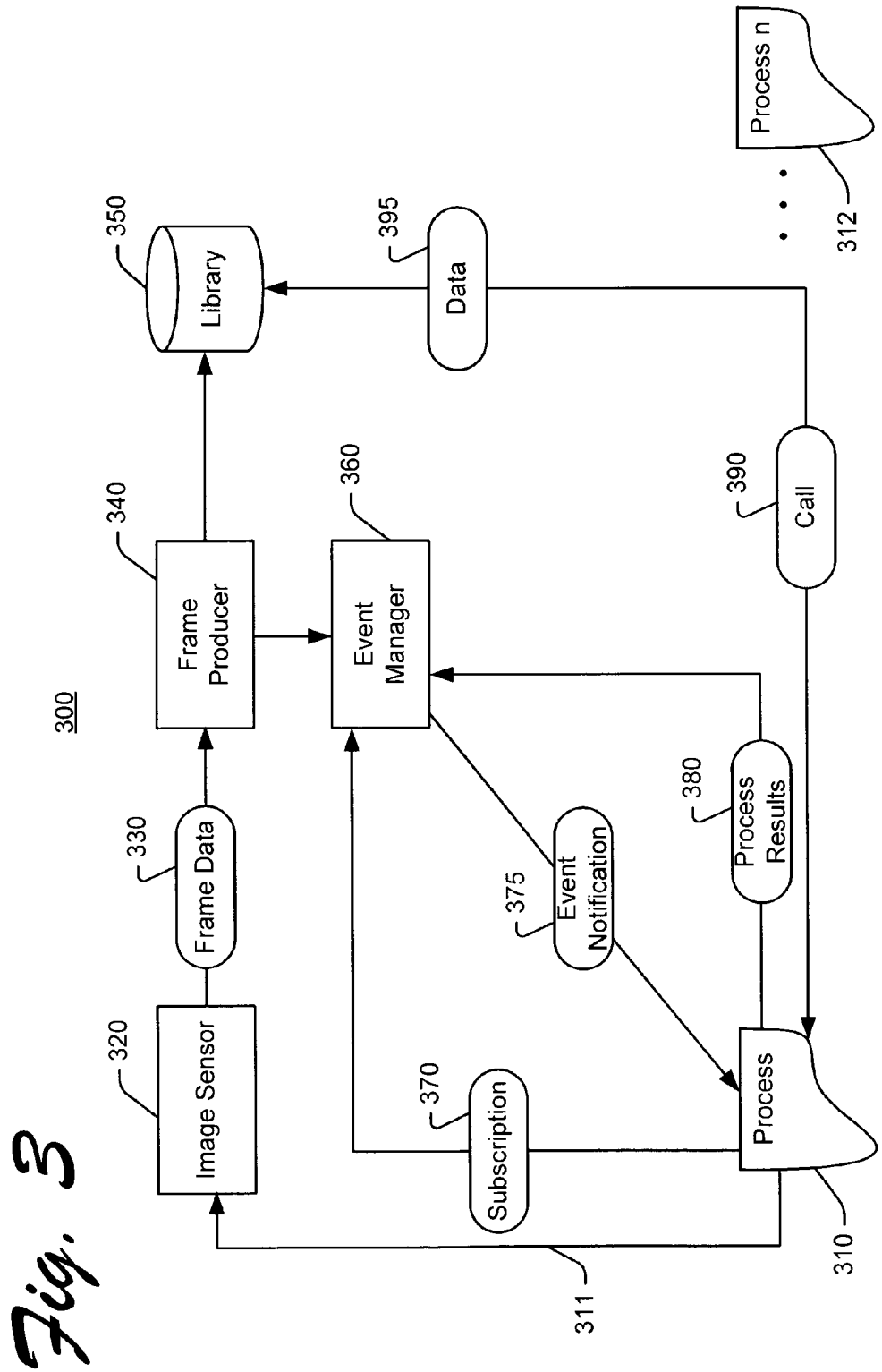
FIG. 3 is a functional block diagram illustrating exemplary event management for camera systems.

FIG. 3 is a functional block diagram 300 illustrating exemplary event management for camera systems (e.g., the camera system 100 shown in FIG. 1). The functional components may be implemented in program code (e.g., the processing logic 170 shown in FIG. 1) residing in memory and executable by a processor (e.g., for camera system 100) and may include individual program code modules for executing various processes 310 and 312 (referred to generally as process or processes 310).

The camera system may include an image sensor 320 (e.g., the image sensor 150 in FIG. 1) which may generate frame data 330 (e.g., via the pre-image logic 160 in FIG. 1). Frame data 330 may be provided to an optional frame producer 340.

The frame producer 340 may store the frame data 330 in an optional library 350, and also may notify an event manager 360 that the frame data 330 is available.

The library 350 may be implemented as a data structure (e.g., residing in the camera system's memory) and program code for managing the data structure. Library 350 provides storage for the frame data and/or process results so that the frame data and/or process results may be accessed by the processes 310 independent and/or concurrently with one another (e.g., as illustrated in one example in FIG. 2). If the library 350 is implemented, frame data and/or process results may be made available without having to "lock" the data during execution of one or more of the processes. In addition, the data does not need to be provided in separate buffers for use by the program code modules. Instead, any one or more of the program code modules may retrieve separate instances of the data at any time independent of the other program code modules.

It is noted that the frame producer 340 and event manager 360 may be implemented as program code (e.g., firmware) executing on a processor for the camera system. In other embodiments, it is noted that the function of the frame producer 340 and event manager 360 may be combined, e.g., as a single firmware component.

Any number of processes (e.g., indicated by Process n in FIG. 3) may be implemented as separate or independent program code modules. Accordingly, each process is modular and can be executed, modified, added, and/or replaced without affecting the other processes. The processes are coordinated via the event manager 360. This coordination is handled by an event subscription/publication model, wherein the event may be, e.g., frame data 330 being available from the image sensor 320 and/or results from executing one or more process 310 being available.

A process 310 may subscribe to one or more events by issuing a subscription 370 to the event manager 360. For example, the process 310 may subscribe to an event when the program code module is first added to the camera system. In another example, the process 310 may subscribe to an event each time the camera system boots. The subscriptions are registered with the event manager 360, and each time a subscribed event occurs, the event manager 360 issues or publishes an event notification to the processes 310 subscribing to that event. The event manager 360 may then publish event notifications 375 to the subscribed processes 310 each time the subscribed event occurs.

For purposes of illustration, process 310 may be an autofocus process which needs frame data for every pre-image. Accordingly, process 310 may subscribe to frame data for every pre-image. When frame data 330 representing every pre-image is available, the event manager 360 may publish an event notification 375 for every pre-image to process 310 indicating that the frame data 330 is available.

In another illustration, process 310 may be an image stabilizing process which only requires frame data representing every other pre-image. Accordingly, process 310 may subscribe to frame data representing every other pre-image. When frame data 330 for every other pre-image is available, the event manager 360 may publish an event notification 375 for every other pre-image to process 310 indicating that the frame data 330 is available.

One or more of the processes 310 may also return process results 380 to the event manager 360 during or after execution of the process 310. The event manager 360 may then notify one or more of the other processes 310 that the process results are available (e.g., via an event notification to a process subscribing to those process results). Optionally, process results 380 may also be stored in the library 350 for retrieval by one or more of the processes 310.

In an exemplary embodiment, the event notification 375 may notify the subscribed processes 310 if frame data 330 and/or process results 380 are available. Optionally, the event notification 375 may also identify the location of the frame data 330 and/or process results 380, e.g., in library 350. The process 310 may then access the frame data 330 and/or process results 380, e.g., by issuing a call 390 to retrieve the frame data 330 and/or process results 380 (illustrated generally as data 395 in FIG. 3) from the library 350. In another exemplary embodiment, the event notification 375 may also include an instance of the frame data 330 and/or process results 380 so that the processes 310 do not need to separately access the library 350, and can begin executing without having to make a separate call 390 to the library 350.

Each process 310 may subscribe to one or more events. In addition, an event notification 375 may be the occurrence of more than one event. For example, an event notification 375 may be issued after frame data representing every third pre-image is available, and the results from another process n 312 are also available. In another example, an event notification 375 may be issued including multiple instances of frame data 330 and/or process results 380. The events and the event notifications will depend at least to some extent on design considerations, such as, but not limited to, the frame data 330 and/or process results 380 which are needed by the process or processes 310 to execute.

It is also noted that the processes do not need to begin execution immediately upon receipt of an event notification 320. Execution timing will also depend at least to some extent on design considerations, such as, but not limited to, when the process results are needed and/or whether execution of the process would consume too many resources of the camera system at any given time.

In exemplary embodiments, a closed-loop data path is provided between the event manager 360, the program code modules (e.g., process 310), and the image sensor 320, e.g., as illustrated by the event notification path between event manager 360 and process 310 and the return data path 311 to image sensor 320. The closed-loop data path receives output from the executing program code modules and feeds back the output to the sensor device for changing the frame data for the event manager. For example, output from the executing auto-focus program code module(s) may indicate the frame data needs additional focusing. Accordingly, the focus point settings on the camera system may be changed to focus the frame data.

In other exemplary embodiments, the program code modules may verify that the frame data has not changed during execution (e.g., by execution of another program code module). If the frame data changed during execution of a process (e.g., was changed by the auto-focus process while a brightness processes were executing), the program code module may be re-executed so that the output (e.g., from the brightness processes) is based on the most recently available frame data.

Before continuing, it is noted that the functional components shown in FIG. 3 and described above are not intended to be limiting. Other functional components (not shown) may also be provided and are not limited to those shown and described herein.

Figure 4:
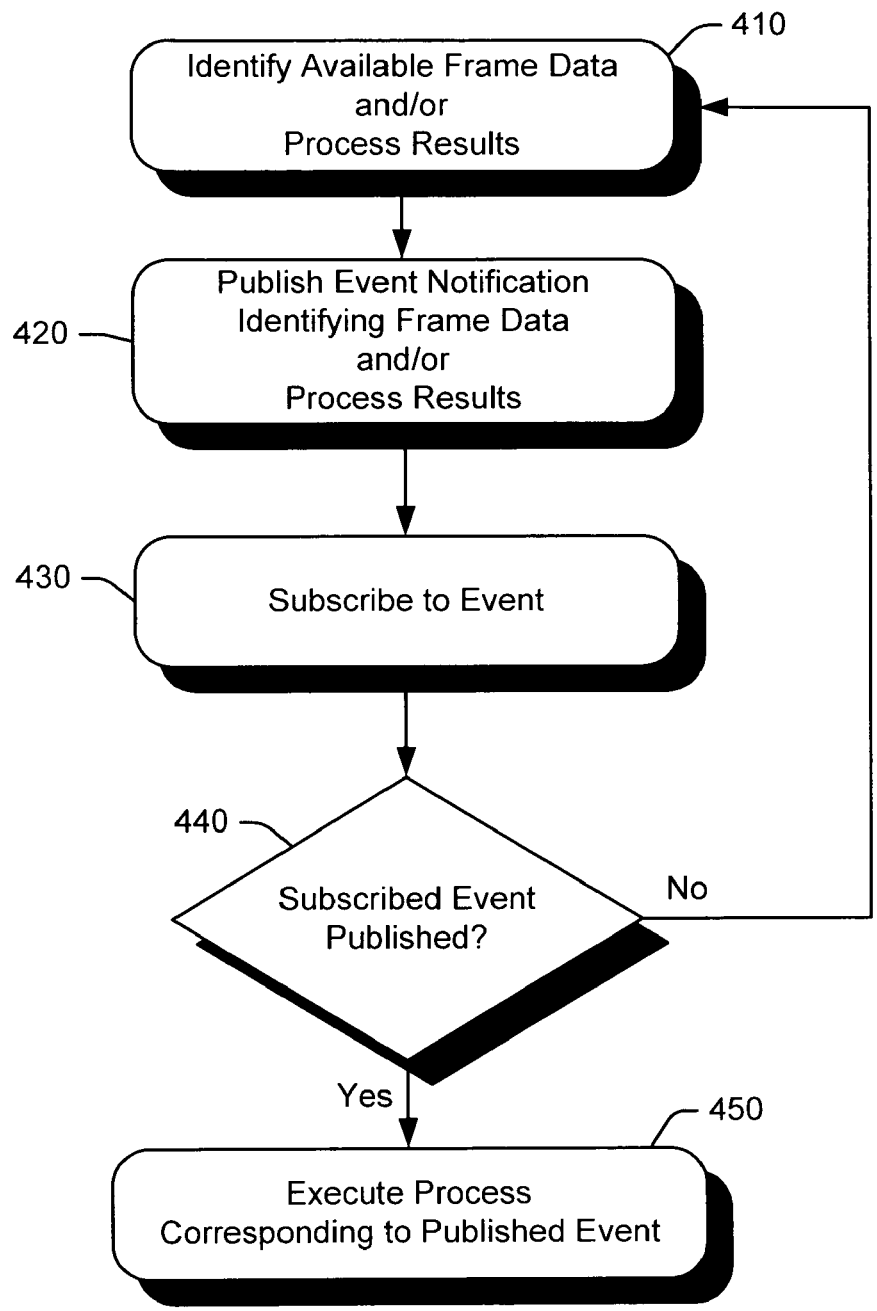
FIG. 4 is a flowchart illustrating exemplary operations which may be implemented in camera systems for event management.

FIG. 4 is a flowchart illustrating exemplary operations which may be implemented in camera systems (e.g., the camera system 100 shown in FIG. 1) for event management. Operations 400 may be embodied as logic instructions on one or more computer-readable medium. When executed on a processor, the logic instructions cause a general purpose computing device to be programmed as a special-purpose machine that implements the described operations. In an exemplary implementation, the components and connections depicted in the figures may be used for event management in camera systems.

In operation 410, frame data and/or process results which are available are identified. For example, the operation may identify frame data available from the pre-image logic and/or the operation may identify process results available from the execution of other processes. In operation 420, an event notification is published which identifies the available frame data and/or available process results. Optionally, the event may also include an instance of the frame data and/or process results.

In operation 430, the program code modules may subscribe to one or more of the events. The program code modules may subscribe to events identifying frame data and/or the program code modules may subscribe to events identifying the process results. It is noted that although a program code module may subscribe to all of the events identifying frame data and/or process results, the program code modules do not need to subscribe to all events.

In operation 440, a determination is made whether the subscribed event has been published. If not, operations may return to operation 410 to continue identifying available frame data and/or process results. If the subscribed event is published, then a process (or processes) corresponding to the published event may be executed in operation 450.

The operations shown and described with reference to FIG. 4 are provided to illustrate exemplary implementations of event management in camera systems. The operations are not limited to the ordering shown. In addition, still other operations may also be implemented as will be readily apparent to those having ordinary skill in the art after becoming familiar with the teachings herein.

It is noted that the exemplary embodiments shown and described are provided for purposes of illustration and are not intended to be limiting. Still other embodiments are also contemplated for event management in camera systems.

The invention claimed is:

1. A camera system comprising:
    an event manager publishing a plurality of event notifications, at least one of the event notifications identifying frame data available from a sensor device, and at least one of the event notifications identifying results available from an executed process, wherein the frame data and results are available to multiple processes without locking the frame data and the results;
    a plurality of independently executable program code modules, each program code module subscribing to at least one of the event notifications and executing a process in response to the event manager publishing the subscribed event notification; and
    a closed-loop data path between the event manager, each of the plurality of independently executable program code modules, and the sensor device, the closed-loop data path receiving output from each of the executable program code modules and feeding back the output to the sensor device for changing the frame data for the event manager.

2. The camera system of claim 1, further comprising a frame producer operatively associated with the sensor device, the frame producer notifying the event manager if frame data is available.

3. The camera system of claim 1, further comprising a library operatively associated with the sensor device, the library storing available frame data for the program code modules.

4. The camera system of claim 3, wherein the library provides the available frame data to a plurality of the program code modules concurrently without having to lock the frame data for use by any particular program code module.

5. The camera system of claim 3, wherein the library provides the available frame data to a plurality of the program code modules concurrently without having to provide the frame data in separate buffers for use by the program code modules.

6. The camera system of claim 1, wherein at least one of the program code modules returns at least one process result to the event manager.

7. The camera system of claim 1, further comprising a library operatively associated with the program code modules, the library storing process results from at least some of the program code modules for use by others of the program code modules.

8. The camera system of claim 7, wherein the library provides the available process results to a plurality of the program code modules concurrently without having to lock the process results for use by any particular program code module.

9. The camera system of claim 7, wherein the library provides the available process results to a plurality of the program code modules concurrently without having to provide the process results in separate buffers for use by the program code modules.

10. A method of event management for camera systems having program code stored on a non-transient computer-readable storage medium and executable by a processor to perform the method comprising:
   publishing a plurality of event notifications identifying available frame data;
   publishing a plurality of event notifications identifying available process results from executing program code modules;
   subscribing a program code module to at least one of the event notifications; and
   executing a process at the program code module corresponding to the subscribed event notification after the subscribed event notification is published, wherein output from the executed process changes the available frame data for use by other program code modules, wherein the frame data and results are available to multiple processes without locking the frame data and the results.

11. The method of claim 10, further comprising verifying the available frame data remained constant during execution of the process by the program code module.

12. The method of claim 11, further comprising re-executing the process if the available frame data changed during execution of the process by the program code module.

13. The method of claim 10, further comprising including an instance of the frame data in the event notification.

14. The method of claim 10, further comprising including an instance of the process results in the event notification.

15. The method of claim 10, further comprising publishing the plurality of event notifications from the executing program code modules at different stages during execution.

16. The method of claim 10, further comprising publishing the plurality of event notifications from the executing program code modules after execution completes.

17. A computer program product including a non-transient computer readable storage medium encoding computer programs for executing a closed-loop computer process on a camera system, the closed-loop computer process comprising independently executable modules for:
   publishing event notifications at least identifying available frame data;
   wherein the event notifications identify at least process results from executing the at least one process;
   subscribing to at least one of the event notifications; and
   executing at least one process corresponding to the subscribed event if the subscribed event is published, wherein output from executing at least one process feeds back to input on the camera system to change the available frame data for executing processes;
   wherein the frame data and results are available to multiple processes without locking the frame data and the results.

18. The computer program product of claim 17 wherein the event notifications include at least one of the following: an instance of the frame data, and an instance of the process results.

* * * * *